Aug. 21, 1956     C. R. JOHNSON     2,759,755
COMBINED BUMPER AND GRILL
Filed Aug. 29, 1952
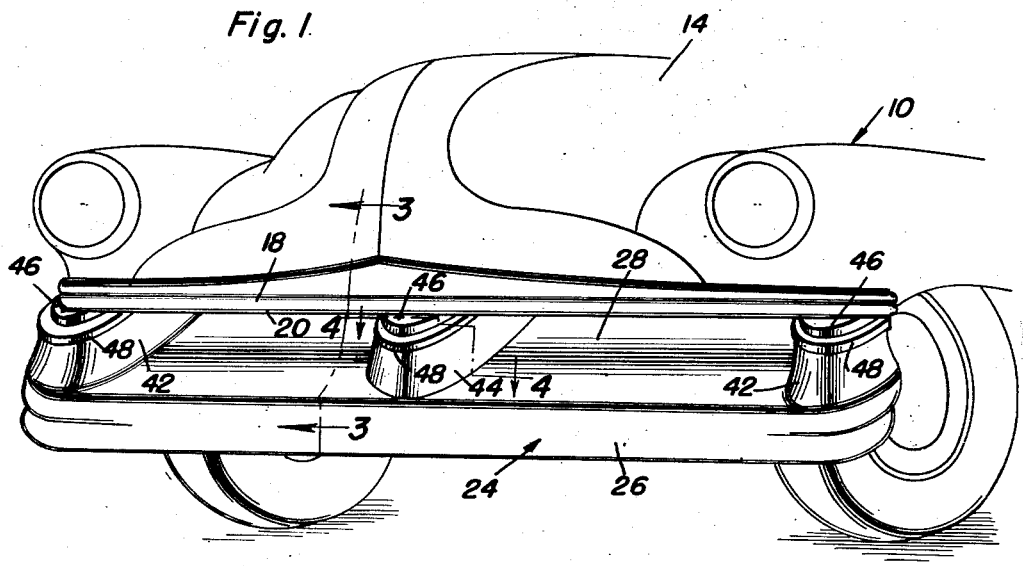
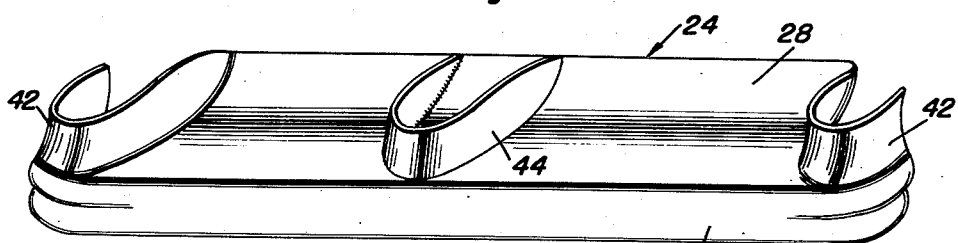
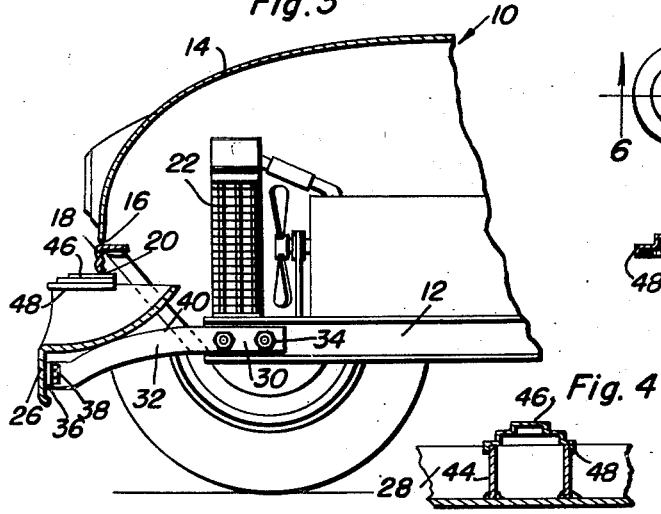
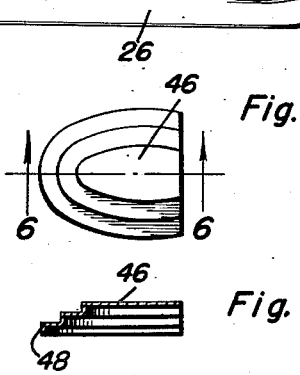
Clarence R. Johnson
INVENTOR.

United States Patent Office 2,759,755
Patented Aug. 21, 1956

2,759,755

COMBINED BUMPER AND GRILL

Clarence R. Johnson, Gary, Ind.

Application August 29, 1952, Serial No. 307,100

1 Claim. (Cl. 293—63)

This invention relates to new and useful improvements in combination bumpers and grills and more particularly to an improvement over such a construction disclosed in my U. S. Patent No. 2,578,068, issued December 11, 1951.

The primary object of the present invention is to provide a combined bumper and grill for automotive vehicles that is supported on the chassis of a vehicle at the front thereof for guarding the front end of the vehicle while baffling air into the motor compartment and against the radiator of the vehicle.

Another important object of the present invention is to provide a combined bumper and grill composed of two unitary horizontal members which are inclined relative to each other, one of the members forming a bumper and the other of the members forming a baffle means for air that is to be directed against the radiator of a vehicle.

A further object of the present invention is to provide a combined bumper and grill that is quickly and readily applied to or removed from the chassis of a vehicle in a convenient manner without in any way harmfully affecting the normal structure of the vehicle.

A still further aim of the present invention is to provide a combined bumper and grill that is extremely simple and practical in construction, strong and reliable in use, neat and attractive in appearance, efficient and durable in operation, inexpensive to manufacture, assemble and replace, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary perspective view of an automotive vehicle and showing the present invention mounted thereon;

Figure 2 is a perspective view of the present invention, the closure caps for the upper open ends of the ribs being removed;

Figure 3 is a fragmentary longitudinal vertical sectional view taken substantially on the plane of section line 3—3 of Figure 1;

Figure 4 is a transverse vertical sectional view taken substantially on the plane of section line 4—4 of Figure 1;

Figure 5 is a plan view of one of the closure caps used in conjunction with the present invention; and Figure 6 is a vertical sectional view taken substantially on the plane of section line 6—6 of Figure 5.

Referring now to the drawings in detail, wherein for the purpose of illustration, there is disclosed a preferred embodiment of the present invention, the numeral 10 represents an automotive vehicle having a chassis 12 and a hood 14, the latter being formed with a horizontal transverse opening 16 in its forward end. A horizontal strengthening and reinforcing strip 18 is fixed to the upper edge of the opening 16 and is provided with a lower horizontal edge 20. The chassis 12 supports a radiator 22 that is disposed behind and which registers with the opening 16.

The present invention does not attempt to claim the above well known structure but is merely an attachment therefor that will function as a combined bumper and grill in that the attachment will be disposed in front of the hood 14 and fenders of the vehicle while including a rearwardly extending portion that will baffle air into the motor compartment and against the radiator 22.

To accomplish the desired results, there is provided an elongated metallic member 24 including a horizontally extending substantially vertically disposed bumper-forming flange 26 and a rearwardly upwardly extending concavo-convexed upper wall 28 forming an air scoop or baffle for directing air toward the radiator 22 and serving as a deflecting plate for stones and the like which may otherwise puncture the radiator. The forward edge of wall 28 is preferably integrally formed with or permanently attached to the upper edge of flange 26.

The rear end portions 30 of rigid mounting arms 32 are removably fixedly attached to the chassis 12 by fasteners 34. The forward flanged ends 36 of the arms 32 are apertured to receive fasteners 38 that are fixed to the rear face of flange 26. Accommodating nuts forming part of the fasteners 38 are threaded on the bolts of the fasteners 38 to secure the flanged ends 36 to the flange 26.

Wall 28 extends rearwardly over the arms 32 and past the strip 18 through the opening 16 and rearwardly thereof toward the radiator 22. The concave surface of the wall 28 faces upwardly and its convex surface engages the downwardly and forwardly curved upper edges 40 of the arms 32, whereby the member 24 will be stabilized and braced to the arms 32.

Hollow end ribs 42 are formed at the ends of wall 28 and substantially parallel a central rib 44 fixed to or formed with the wall 28. The ribs 42, 44 are spaced longitudinally of the member 24 and extend transversely thereof throughout the transverse dimension of wall 28 to provide means for strengthening and reinforcing wall 28.

The ribs 42, 44 extend under the strip 18 and are open at their tops, however, the forward parts of these open tops are closed by horizontal closures or caps 46. The caps 46 are stepped and the lower arcuate steps or rises 48 of these caps are shaped to frictionally engage about the upper forward parts of the ribs with the flat top surfaces of the caps 48 engaging under edge 20 of strip 18, as shown in Figure 3.

In practical use of the present invention, as the vehicle moves forwardly, air will be directed by the upper wall 28 toward the radiator 22. The flange 26 being disposed in front of the hood 14 and also in front of the fenders of the vehicle will engage any obstruction prior to the engagement of the obstruction by the hood or fenders.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claim.

Having thus described the invention, what is claimed as new is:

A combined bumper and radiator air scoop for automotive vehicles comprising a horizontally disposed, substantially vertically extending bumper element for attachment to the vehicle chassis in front of a vertical opening in a hood of the vehicle, said element having a rearwardly and upwardly extending radiator baffle plate joined to the upper edge thereof, said plate being upwardly concave for scooping air toward the vehicle radiator and extending through said opening rearwardly thereof, upwardly projecting transverse reinforcing ribs mounted at spaced intervals along said plate and forming a portion of the vehicle grill, and cap members on said ribs engageable with a transverse bar on the vehicle at the upper edge of the opening.

References Cited in the file of this patent

UNITED STATES PATENTS

| | | |
|---|---|---|
| D. 125,007 | Walker | Feb. 4, 1941 |
| 1,413,283 | McCracken | Apr. 18, 1922 |
| 2,036,560 | Backus | Apr. 7, 1936 |
| 2,191,599 | Valletta | Feb. 27, 1940 |
| 2,578,068 | Johnson | Dec. 11, 1951 |
| 2,621,955 | Dykstra | Dec. 16, 1952 |